United States Patent
Poole et al.

(10) Patent No.: US 11,112,518 B2
(45) Date of Patent: Sep. 7, 2021

(54) METHOD AND APPARATUS FOR DEBLENDING SEISMIC DATA USING A NON-BLENDED DATASET

(71) Applicant: CGG SERVICES SA, Massy (FR)

(72) Inventors: Gordon Poole, East Grinstead (GB); Henning Hoeber, East Grinstead (GB); Adel Khalil, Aberdeen (GB)

(73) Assignee: CGG SERVICES SAS, Massy (FR)

( * ) Notice: Subject to any disclaimer, the term of this patent is extended or adjusted under 35 U.S.C. 154(b) by 189 days.

(21) Appl. No.: 14/967,679

(22) Filed: Dec. 14, 2015

(65) Prior Publication Data

US 2016/0245942 A1 Aug. 25, 2016

Related U.S. Application Data

(60) Provisional application No. 62/119,884, filed on Feb. 24, 2015.

(51) Int. Cl.
*G01V 1/36* (2006.01)
*G01V 1/32* (2006.01)
*G01V 1/28* (2006.01)

(52) U.S. Cl.
CPC .............. *G01V 1/364* (2013.01); *G01V 1/282* (2013.01); *G01V 1/32* (2013.01); *G01V 1/368* (2013.01); *G01V 2210/324* (2013.01)

(58) Field of Classification Search
None
See application file for complete search history.

(56) References Cited

U.S. PATENT DOCUMENTS

| | | | |
|---|---|---|---|
| 8,295,124 B2 | 10/2012 | Abma | |
| 8,395,966 B2 | 3/2013 | Moore et al. | |
| 8,675,447 B2 | 3/2014 | Poole | |
| 8,750,073 B2 | 6/2014 | Robertsson et al. | |
| 9,075,162 B2 | 7/2015 | Baardman et al. | |
| 9,081,107 B2 | 7/2015 | Abma et al. | |
| 9,091,788 B2 | 7/2015 | Trad et al. | |
| 2008/0019215 A1* | 1/2008 | Robertsson | G01V 1/3843 367/19 |
| 2010/0271904 A1* | 10/2010 | Moore | G01V 1/3808 367/73 |

(Continued)

FOREIGN PATENT DOCUMENTS

| | | |
|---|---|---|
| WO | 2015/063595 A1 | 5/2015 |
| WO | 2015/063597 A1 | 5/2015 |

OTHER PUBLICATIONS

R.L. Abma et al., "Separating Simultaneous Sources by Inversion", 71st EAGE Conference & Exhibition—Amsterdam, The Netherlands, Jun. 8-11, 2009.

(Continued)

*Primary Examiner* — Khaja Ahmad
(74) *Attorney, Agent, or Firm* — Patent Portfolio Builders PLLC

(57) ABSTRACT

A non-blended dataset related to a same surveyed area as a blended dataset is used to deblend the blended dataset. The non-blended dataset may be used to calculate a model dataset emulating the blended dataset, or may be transformed in a model domain and used to derive sparseness weights, model domain masking, scaling or shaping functions used to deblend the blended dataset.

16 Claims, 7 Drawing Sheets

(56) References Cited

U.S. PATENT DOCUMENTS

| | | | |
|---|---|---|---|
| 2013/0176819 A1* | 7/2013 | Poole | G01V 1/362 367/38 |
| 2013/0235697 A1* | 9/2013 | Szydlik | G01V 1/282 367/73 |
| 2014/0036060 A1* | 2/2014 | Claussen | G01V 1/003 348/85 |
| 2014/0081576 A1 | 3/2014 | Grenie et al. | |
| 2014/0278289 A1* | 9/2014 | Etgen | G01V 99/005 703/2 |
| 2014/0303898 A1 | 10/2014 | Poole | |
| 2015/0234066 A1 | 8/2015 | Poole et al. | |
| 2017/0082761 A1* | 3/2017 | Li | G01V 1/364 |

OTHER PUBLICATIONS

Peeter Akerberg et al., "Simultaneous source separation by sparse Radon transform", SEG Las Vegas 2008 Annual Meeting.

A.J. (Guus) Berkhout et al., "From simultaneous shooting to blended acquisition", SEG Las Vegas 2008 Annual Meeting, pp. 2831-2838.

Gary Hampson et al., "Acquisition Using Simultaneous Sources", SEG Las Vegas 2008 Annual Meeting.

Uzma Mahmood, "Investigating Different Approaches of Deblending Seismic Data", Master Thesis, Department of Geosciences, University of Oslo, Facult of Mathmatics and Natural Sciences.

Ian Moore et al., "Simultaneous source separation using dithered sources", SEG Las Vegas 2008 Annual Meeting.

Gordon Poole et al., "A deblending strategy using alternating constant delay simultaneous source data", SEG Denver 2014 Annual Meeting, pp. 4335-4339.

J. Stefani et al., "Acquisition Using Simultaneous Sources" B006, EAGE 69th Conference & Exhibition—London, UK, Jun. 11-14, 2007.

Daniel Trad et al., "Latest views of the sparse Radon transform", Geophysics, vol. 68, No. 1 (Jan.-Feb. 2003); pp. 386-399.

Wang Han-Chuang et al., "Separation Method for Multi-source Blended Seismic Data", Applied Geophysics, vol. 10, No. 3, Sep. 2013, pp. 251-252.

Extended European Search Report in corresponding European Application No. EP 15 30 7031 dated Jul. 26, 2016.

Heiko Claussen, et al.; "Multi-Dimensional Coherence Deblending of Simultaneous Sources"; Geoscience and Remote Sensing Symposium; 2012 IEEE International; XP032469695; Jul. 22, 2012; pp. 6071-6074.

D. Gray, et al.; "Observations of Azimuthal Anisotropy in Prestack Seismic Data"; Society of Exploration Geophysicists; 2007 SEG Annual Meeting; Sep. 23-28, 2007; pp. 373-377; San Antonio, Texas.

EP 94(3) Communication issued in corresponding/related European Application No. EP 15 30 7031 dated Mar. 10, 2021.

* cited by examiner

METHOD AND APPARATUS FOR DEBLENDING SEISMIC DATA USING A NON-BLENDED DATASET

CROSS REFERENCE TO RELATED APPLICATIONS

This application claims priority and benefit from U.S. Provisional Patent Application No. 62/119,884, filed Feb. 24, 2015, entitled "Strategy for Deblending In The Case A Non-Blended Dataset is Available," the content of which is incorporated in its entirety herein by reference.

BACKGROUND

Technical Field

Embodiments of the subject matter disclosed herein generally relate to deblending seismic data in which receivers simultaneously detect reflections due to different emitted excitations or, more specifically, to using a non-blended dataset acquired in a same survey area to deblend the seismic data.

Discussion of the Background

The structure of underground formations is customarily explored with seismic surveys that generate images used, for example, to locate gas and oil reservoirs. Seismic surveys acquire and study reflections of seismic signals injected into the surveyed formations. The signals are reflected, refracted and/or transmitted when they experience variations in propagation velocity. Receivers detect and record these reflections as seismic data. Over time, the amount of seismic data and complexity in processing it have increased tremendously due to development of more sophisticated data processing capacity (both hardware and software) and survey equipment (seismic signal sources, receivers, etc.). These improvements yield sharper images of underground formations, increasing the volume and density of information. However, the time needed to acquire survey data has continued to remain an important limitation in the cost-effectiveness of this type of geological prospecting.

One way to reduce survey time is to use a technique known as "simultaneous source acquisition." In this type of acquisition, time intervals between generating signals incident to the surveyed underground formation are shorter than the listening time needed to record all the reflections after one signal. Simultaneous source acquisition is now performed on land and in marine environments (with ocean bottom receivers or towed streamers), with continuous or non-continuous recording. Using simultaneous source acquisition yields blended seismic data (i.e., acquired by receivers detecting overlapping reflections due to different incident signals), and, therefore, additional data pre-processing (known as "deblending") becomes necessary to extract datasets for each incident signal.

Conventional deblending methods take advantage of data acquisition features differentiating between overlapping reflections (for example, different vibroseis sweeps or pseudo-random sweeps). When energy (reflections) due to one signal is time-aligned, applying a designature operator corresponding to that signal focuses the energy of reflections due to that signal while keeping energy (reflections) due to other signals dispersed. Many algorithms rely on denoising or sparseness constraints to make the energy due to different signals separable based on the actual timing of the shots (i.e., signal emissions). Conventional deblending methods fall into the following three categories (all of which rely on some degree of randomized shooting): impulsive denoise, iterative coherency enhancement/denoising, and full modeling of energy from all the sources.

Impulsive denoise methods (as described, e.g., in the article, "Acquisition using simultaneous sources," by Stefani, et al., 69th EAGE Conference & Exhibition, London 2007, the content of which is incorporated herein by reference) uses the fact that when data is sorted into any domain other than common shot, the cross-talk noise from other sources has random timing. This random timing allows using already-available impulsive noise attenuation techniques for deblending. While these methods may be effective for removing the strongest cross-talk energy, low amplitude cross-talk noise is not seen as impulsive and, therefore, is not removed. Another drawback of these methods is that primary energy may be attenuated due to the use of thresholds.

Iterative coherency enhancement/denoising methods (as described, e.g., in U.S. Pat. No. 8,295,124 to Abma, the content of which is incorporated herein by reference) rely on the fact that cross-talk noise on some traces is always a duplication of signal energy on other traces. Therefore, the signal estimate for one source can be used to reduce the level of cross-talk for all other sources based on the known timing of all shots. Abma uses the POCS (i.e., "projection onto convex sets") algorithm for signal estimation, but stipulates that many other algorithms can be used (FX deconvolution, dip filtering, x-t deconvolution, etc.).

Full modeling of energy from all the sources has similarities to the iterative denoising method, except that this formulation solves the relationship between source energy and cross-talk noise implicitly at the heart of the problem formulation. Such methods are described, e.g., in the article, "Simultaneous source separation by sparse Radon transform," by Akerberg, P., et al., 78th Ann. Internat. Mtg.: Soc. of Expl. Geophys., pp. 2,801-2,805, 2008; and the article, "Simultaneous source separation using dithered sources," by Moore, I., et al., 78th Ann. Internat. Mtg.: Soc. of Expl. Geophys., pp. 2,806-2,810, 2008; and U.S. Pat. No. 8,395,966, the entire contents of which are incorporated herein by reference. Equations are formulated to design a transform domain for each source (e.g., τ-p domain, Fourier domain, etc.) such that a solution that is reverse-transformed and re-blended matches the raw input data as accurately as possible in a least squares sense. These methods rely on the timings and positions of all sources and seek a sparse solution in the transformed domains. Once the transform domains have been calculated, application of reverse transform and re-signature without re-blending yields deblended data. These methods filter out some of the original data, but efficiently remove low-amplitude cross-talk noise and preserve primary signal. This approach could be considered an alternative way to solve the same problem as the iterative coherency enhancement/denoising technique (with the analog of sparse least squares Radon versus inversion through "iterative cleaning").

Since conventional methods each have some drawbacks or are efficient only for seismic data acquired in a predetermined favorable manner, it is desirable to develop methods to deblend seismic data that are more robust and less dependent on the manner of data acquisition, while mitigating the above-identified drawbacks of conventional methods.

SUMMARY

Various embodiments set forth in this document describe using a non-blended dataset acquired for the same area as a blended dataset for deblending the blended dataset.

According to an embodiment, there is a seismic data deblending method including: obtaining a first non-blended dataset and a second blended dataset related to a same surveyed area, calculating a model dataset emulating the second blended dataset based on the first non-blended dataset, and deblending the second blended dataset using the model dataset.

According to another embodiment, there is a method for deblending seismic data including: obtaining a first non-blended dataset and a second blended dataset related to a same surveyed area, transforming the first non-blended dataset in a model domain, and deblending the second blended dataset using the transformed first dataset.

According to yet another embodiment, there is a seismic data processing apparatus including a data processing unit and an interface configured to obtain a first non-blended dataset and a second blended dataset related to a same surveyed area. The data processing unit includes one or more processors and is configured to calculate a model dataset emulating the second blended dataset based on the first non-blended dataset, and to deblend the second blended dataset using the model dataset. Alternatively or additionally the data processing unit is also configured to transform the first non-blended dataset in a model domain, and to deblend the second blended dataset using the transformed first dataset.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
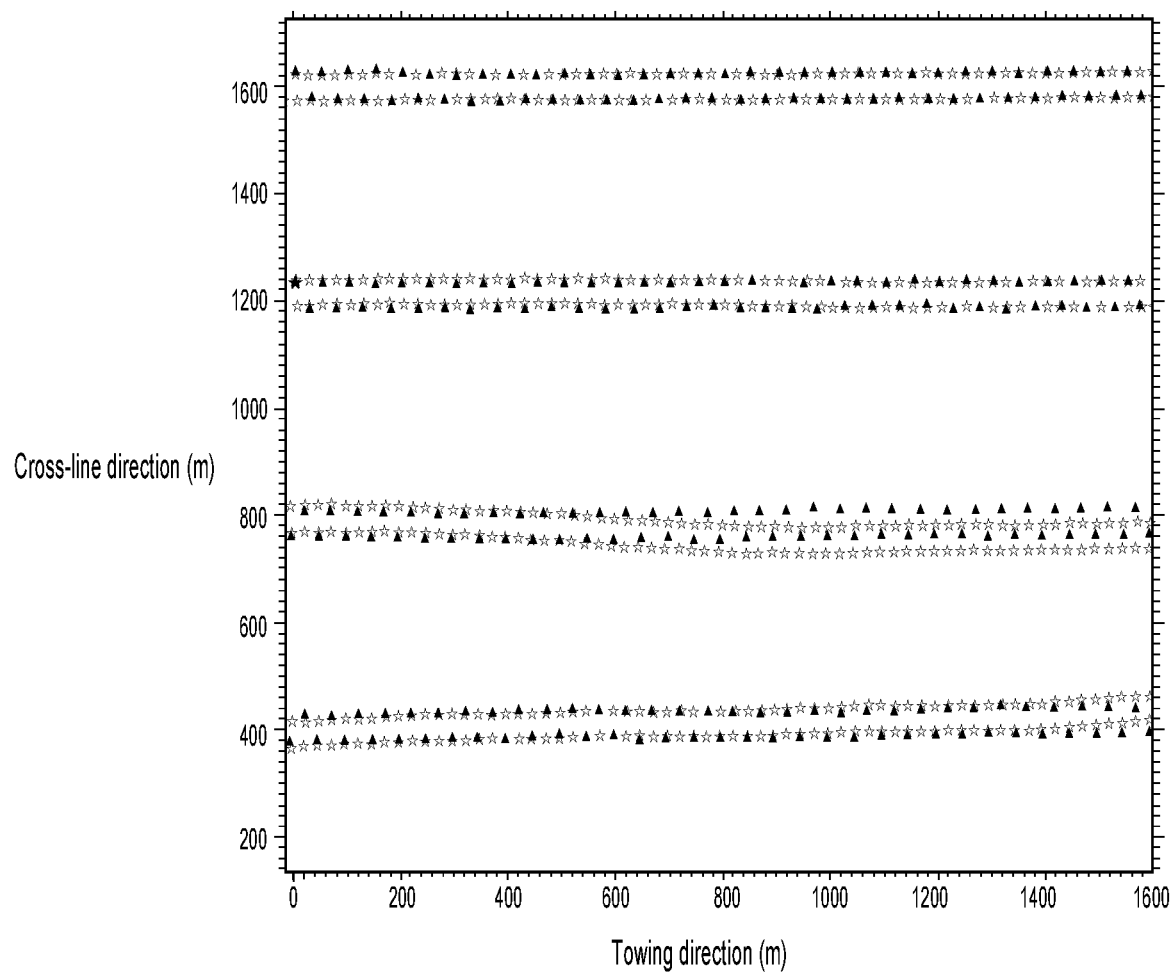
FIG. 1 illustrates shot positions along four sail lines in a horizontal plane, for blended (star) and non-blended (triangle) acquisitions.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are usable for most types of seismic data acquisition (land, marine, etc.).

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The various methods set forth in this section use a pre-existing non-blended dataset to deblend a blended dataset. The non-blended and blended datasets have both been acquired by surveying the same area. The non-blended dataset may be used to calculate a model dataset emulating the second blended dataset. Alternatively or additionally, the non-blended dataset may be transformed in a model domain.

A non-blended dataset and a blended dataset for a same surveyed area may occur in the case of a multi-vintage survey (e.g., time-lapse) where the non-blended dataset (e.g., the baseline dataset) was acquired earlier without simultaneous shooting, and the blended dataset (e.g., a monitor dataset) was acquired with simultaneous shooting. A non-blended dataset and a blended dataset for a same surveyed area may also occur in a non-time-lapse acquisition, for example, if during a survey, some sail-lines are acquired with simultaneous shooting yielding a blended dataset, and other sail-lines are acquired without simultaneous shooting yielding a non-blended dataset. The methods may be used for datasets acquired on land, in marine, or in transition zone environments. The non-blended dataset may also have been acquired as blended data and deblended independently. This may include acquiring a first blended dataset, deblending a first blended dataset, and using the deblended first dataset to help deblend a second blended dataset.

Most of the following description refers to two datasets, but it should be understood that the various embodiments described herein may also be used in the case more than two datasets have been acquired over the same survey area. For example, this may include one non-blended dataset and one or more blended datasets, more than one non-blended dataset and one or more blended datasets, or any combination of non-blended and blended datasets.

The methods are not source-specific and may be applied to seismic data acquired when using any type of source (impulsive or non-impulsive). Impulsive sources may be airguns, vibroseis, pingers, boomers, sparkers, marine vibrators, dynamite, etc., and non-impulsive sources may be non-synchronized airgun arrays, mini-sosie, or vibrators (land or marine). The emitted signals may be characterized by linear sweeps, non-linear sweeps, step sweeps, up sweeps, down sweeps, pseudo-random, pseudo-orthogonal, or other sweeps.

The method may be used for data acquired using streamers carrying receivers at a constant depth, on a slanted, sinusoidal, or other variable-depth profile. The streamer's profile may begin with a constant depth portion connected to the towing vessel, and end with another constant depth portion at the distal end, with a middle portion having a variable depth profile. Alternatively, a horizontal portion may be present only at the beginning or at the end of the streamer. The receivers may be geophones, hydrophones, differential pressure sensors, particle motion sensors, particle velocity sensors, accelerometers, or other sensors configured to detect acoustic or elastic energy. The data may be 1 D, 2D, 3D, narrow azimuth, multi-azimuth, full-azimuth, or wide-azimuth. The simultaneous shooting may relate to independent shooting, where both sources are fired at the same instant in time, constant delay time shooting, dithered time shooting, randomized time shooting, optimized time shooting, or another multi-source sim-shoot acquisition scenarios.

Blended seismic data is generated by receivers simultaneously detecting reflections due to distinct emitted signals. Note that the term "simultaneously" here is not limited to overlapping, but includes also alternating; in other words, reflections due to different signals cannot be separated in time.

FIG. 1 illustrates shot positions along four sail-lines in a horizontal plane, for blended (star) and non-blended (triangle) acquisitions. Along the upper sail-lines, the shot positions are accurately repeated, but for the other lines the shot positions drift.

Figure 2:
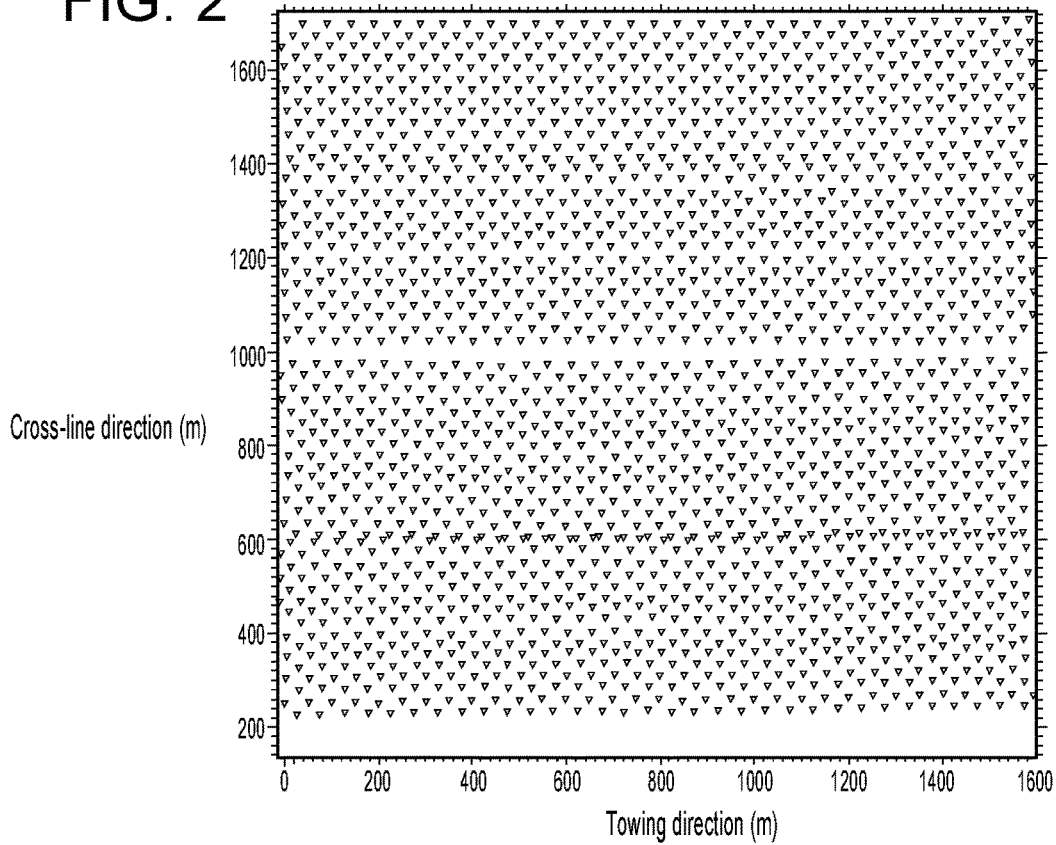
FIGS. 2 and 3 illustrate common midpoints (CMPs) for the non-blended and blended dataset, respectively.
Figure 3:
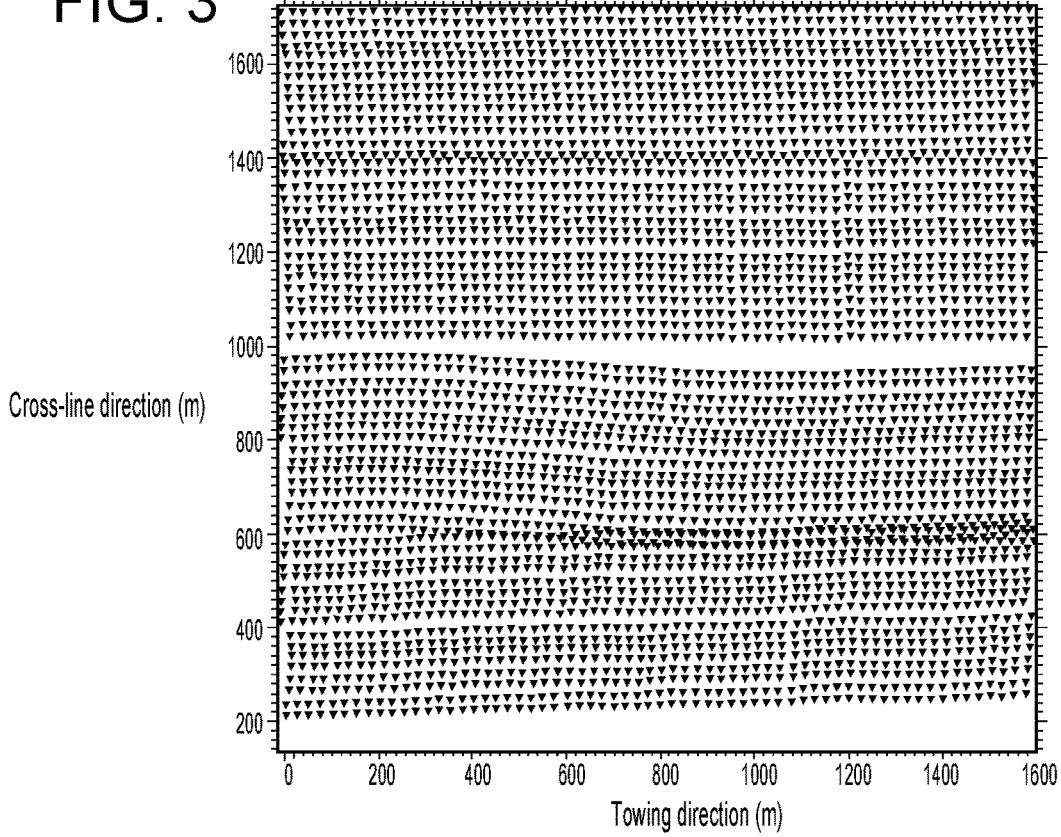

FIGS. 2 and 3 illustrate common midpoints (CMPs) in 1.5×1.5 km area, for the non-blended and blended dataset, respectively. Comparing these two Figures, one notices (besides the higher density of points in the blended dataset) that in some positions the CMPs overlap, while in others, cable feather caused inconsistent positioning.

Figure 4:
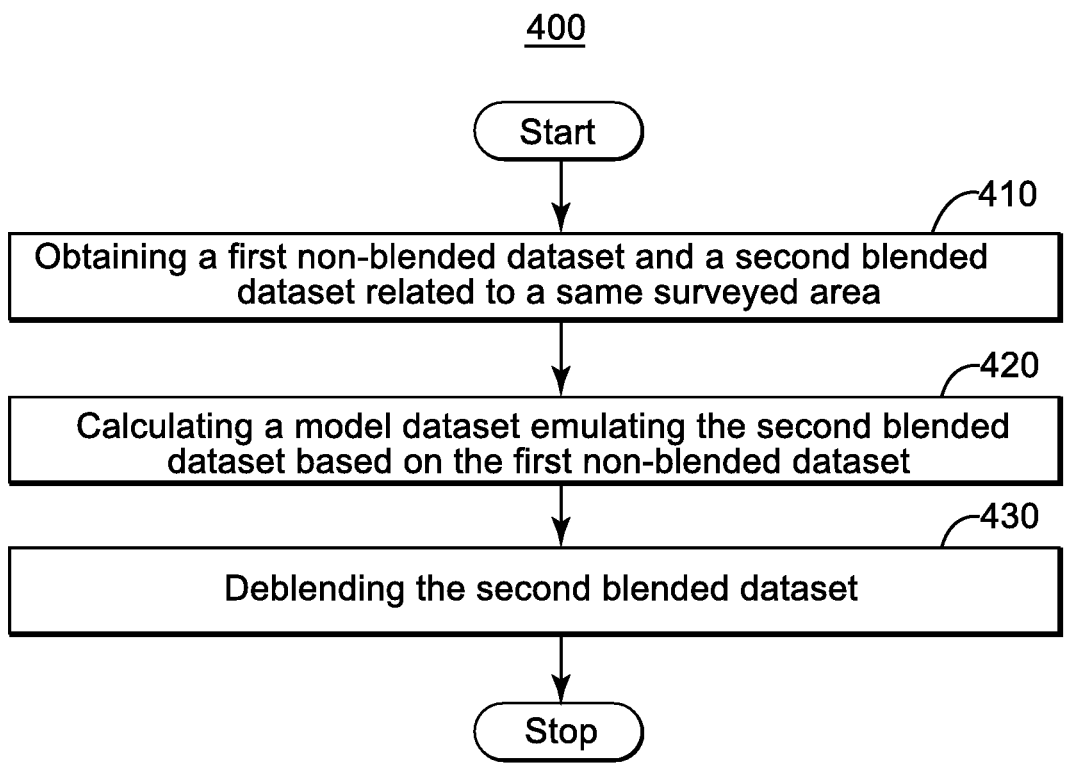
FIG. 4 is a flowchart of a deblending method according to an embodiment.

FIG. 4 is a flowchart of a method 400 according to an embodiment. Method 400 includes obtaining a first non-blended dataset and a second blended dataset related to a same surveyed area at 410.

The method further includes calculating a model dataset emulating the second blended dataset based on the first non-blended dataset at 420. Method 400 then includes deblending the second blended dataset using the model dataset at 430.

In some embodiments, the model dataset is calculated by interpolation (which is discussed in more detail later in this document). The interpolated dataset may be used to mitigate cross-talk noise in the second blended dataset. This cross-talk noise mitigation may be performed by: blending the model dataset to form a continuous recording trace, pseudo-blending the continuous recording trace, calculating a cross-talk estimate based on the pseudo-blended continuous recording trace, and subtracting the cross-talk noise from the second blended dataset.

A changemap including anticipated signal-to-blend noise ratios (SNRs) evaluated based on the model dataset may be generated. The SNRs may be evaluated by calculating the ratio of energy in the estimated signal to the energy in the estimated predicted noise. This calculation may be performed in time-space or another domain, and may involve considering an envelope of the data or calculating the coherency/semblance or other similar measure. This changemap may then be used to derive sparseness weights used to deblend the second blended dataset. The sparseness weights may be in the time-space domain or in a model domain. Alternatively or additionally, the changemap may be used to derive filters to be applied to the second blended dataset.

In some embodiments, the model dataset is calculated by numerically blending the first non-blended dataset based on locations and times extracted from the second blended dataset. The deblending then includes comparing blend noise of the blended first non-blended dataset and the second blended dataset.

Figure 5:
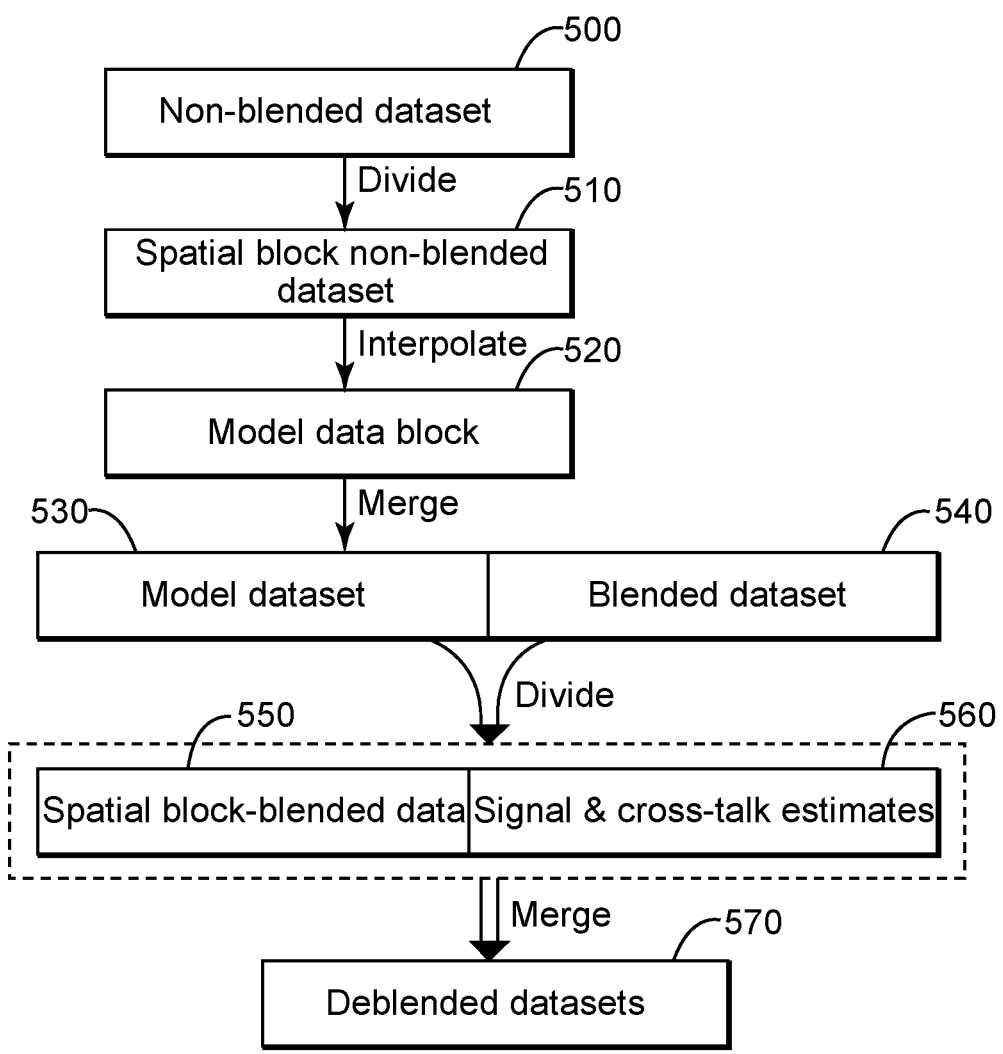
FIG. 5 is a dataflow of a deblending method according to an embodiment.

FIG. 5 illustrates a dataflow of a deblending method according to an embodiment. Non-blended data 500 is first divided into spatial blocks (e.g., receiver gathers, common mid-point gathers, offset volumes, etc.). For each spatial block 510 of the non-blended data, model data block 520 is generated by interpolating the non-blended data block to corresponding shot and receiver positions in the blended dataset. Alternatively the non-blended dataset may be interpolated to a position relating to a function of the shot and receiver positions, for example: midpoints, offsets, CCP (common convergence point), ACP (asymptotic convergence point), azimuth, etc.

Many methods exist to interpolate data, for example based on deriving a model of the data or by deriving prediction filters. In addition to interpolation within a densely sampled dimension, interpolation in an under sampled direction may also be achieved using assumptions. One such example of an under sampled dimension is the azimuth direction for narrow azimuth towed streamer data. Formulas employed for azimuth correction in this interpolation are known; for example, they are set forth in *Geophysics*, Vol. 36, No. 4, edited by Levin, F., August 1971 (relevant portions of which are incorporated herein by reference).

Figure 6:
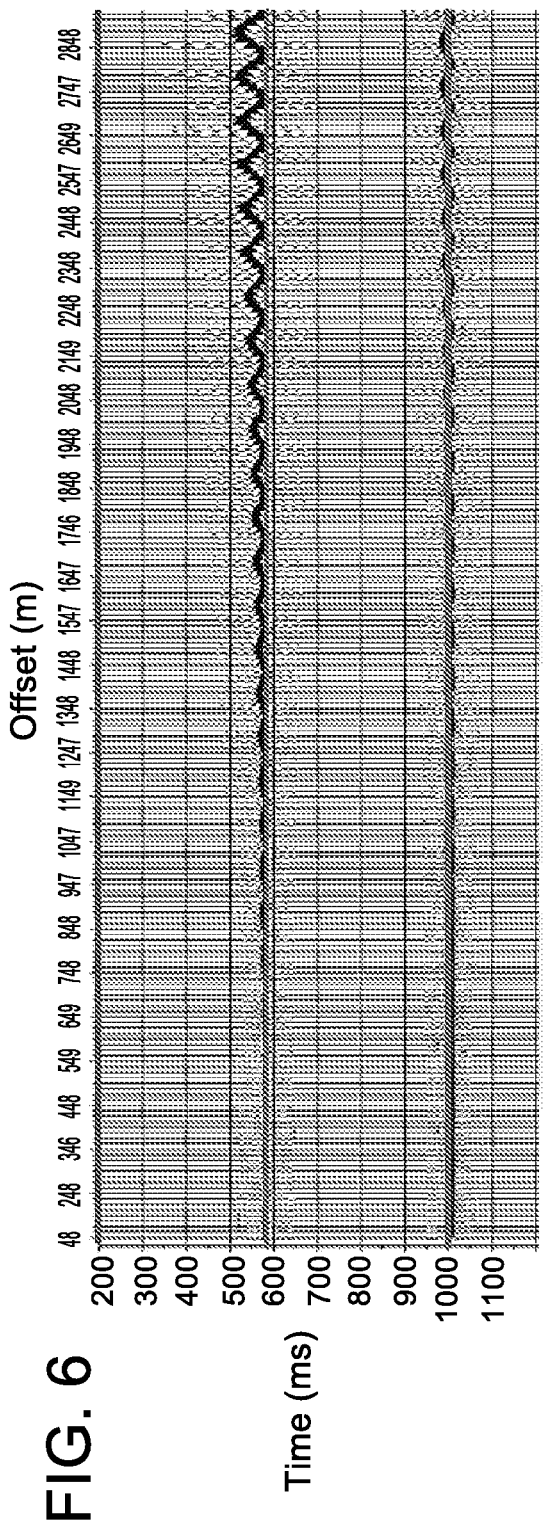
FIGS. 6 and 7 illustrate the effect of azimuth corrections during interpolation.
Figure 7:
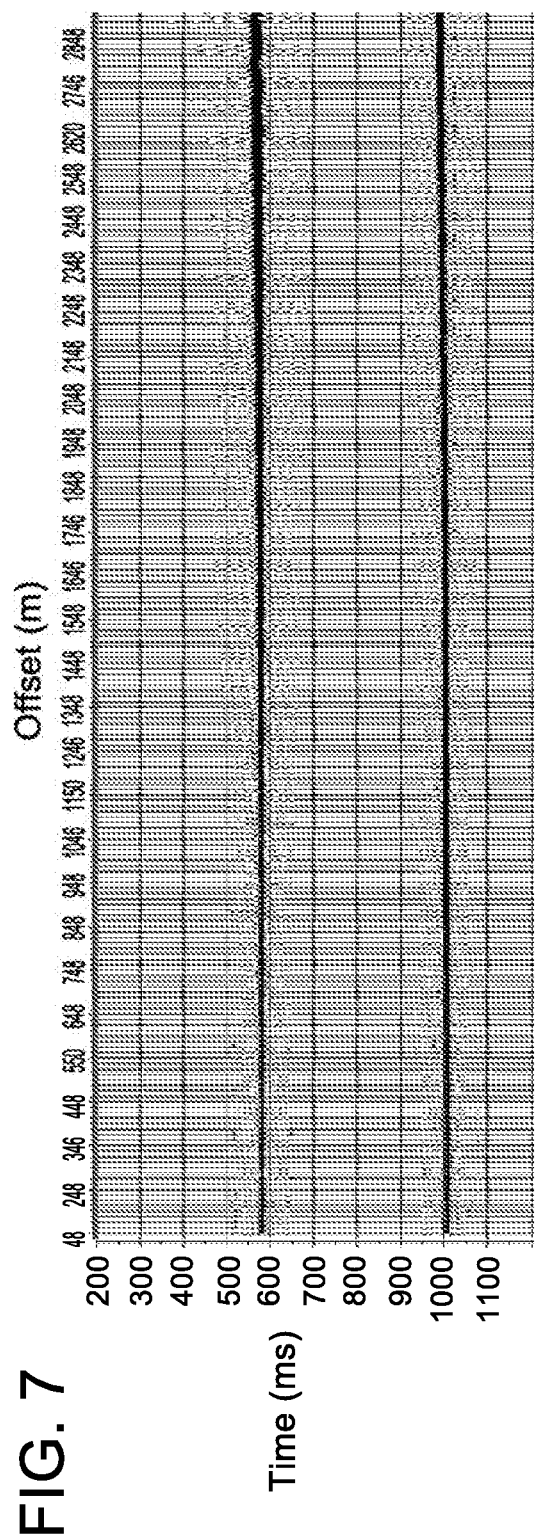

During interpolation, the azimuth time shift allows input data to be harmonized to a fixed azimuth direction (normally the inline direction) using a constant velocity/straight ray assumption. Azimuth time shifts depend on: two-way time, input trace offset, input trace azimuth, reflection dip and azimuth. Azimuth correction effect is illustrated in FIGS. 6 and 7, which are graphs (vertical axis is time and horizontal axis is offset) of the same common midpoint gather sorted in common offset/common azimuth (COCA) order for common azimuth without and with azimuth correction, respectively. COCA ordering is described in article "Observations of seismic anisotropy in prestack seismic data" by D. Gray, published in 77th Annual International Meeting, Society of Exploration Geophysicists, Expanded Abstracts, pp. 119-123, which is incorporated herewith by reference. A wraparound normal move-out (NMO) or other function may be used to improve the interpolation. The wraparound NMO may be considered as a normal moveout correction performed before data interpolation to reduce the data complexity in the offset direction. After data interpolation, normal moveout may be removed based on the output trace positions.

The interpolation algorithms may vary depending on the datasets' characteristics. The interpolation strategy may employ the derivation of filters or a model domain. The model domain may be linear or non-linear. Examples of interpolation algorithms may be fx-interpolation, Gulunay interpolation, Porsani interpolation, anti-leakage Fourier interpolation, minimum weighted norm interpolation, matching pursuit-based interpolation, Radon-based methods, singular value decomposition, linear interpolation, hyperbolic interpolation, parabolic interpolation, shifted hyperbola interpolation, singular value decomposition, kriging, projection onto convex set, rank reduction, curvelet, ridgelet, contourlet or another method. The strategies may be employed in the frequency (e.g., Fourier, z-transform, curvelet, wavelet, Walsch, etc.) or the time domain. Any of the methods may be adapted so that the filter or model domain is sparse. The use of model domains where the input data may be defined by a small number of model parameters may allow a sparse representation of the data, thereby enabling interpolation of irregularly sampled data and/or overcoming aliasing.

Returning now to FIG. 5, the model data blocks 520 are merged, yielding the model dataset 530 emulating the dataset to be deblended. Model dataset 530 and blended dataset 540 are optionally divided into similar spatial blocks. For each of these spatial blocks (a loop is suggested by the dash-line rectangle), a signal and a cross-talk estimate 560 are built based on the model dataset. The signal and a cross-talk estimate 560 are joint-adaptively subtracted from spatial block 550 of the blended dataset. The output may then be an adapted model for reflections corresponding to each source, including some residual, or not including any residual. This output or other blocks resulting in subtraction are used for obtaining deblended datasets 570.

Figure 8:
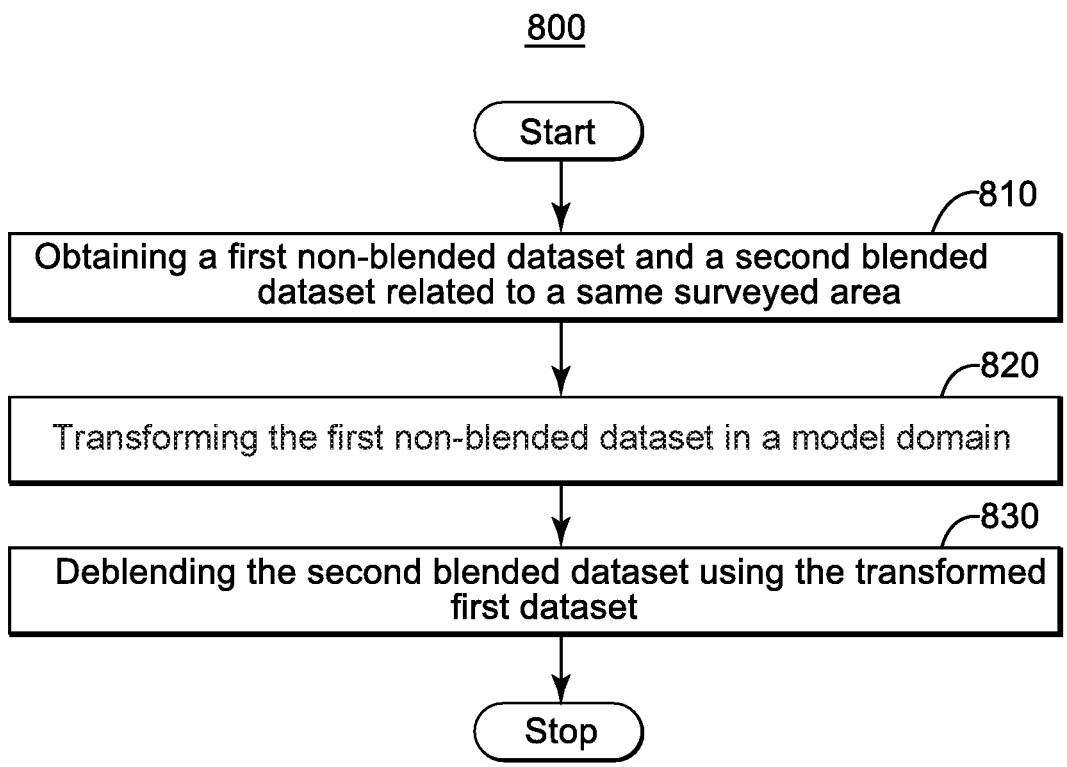
FIG. 8 is a flowchart of a deblending method according to an embodiment.

According to another embodiment illustrated in FIG. 8, a deblending method 800 includes obtaining a first non-blended dataset and a second blended dataset related to a same surveyed area at 810, transforming the first non-blended dataset in a model domain at 820, and deblending the second blended dataset using the transformed first dataset at 830. In one embodiment, the second blended dataset is deblended by an inversion method using sparseness weights derived from the transformed first dataset. In other embodiments, deblending of the second blended dataset is performed using a model domain masking, scaling or shaping function derived using the transformed first dataset.

In some regions, for example where the surveyed underground structure is relatively simple, the interpolation step may not strictly be necessary. In this case, the non-blended data may be duplicated as necessary to provide a signal estimate for each blended trace. The duplication may involve operations aimed at making the signal more similar to the blended data, e.g., differential NMO.

Interpolation may involve reconstructing data at irregular positions. This may be achieved with many of the above algorithms, especially when a model representation of the data has been made which may be used to output data at any position. The algorithm may be applied in 1 D, 2D, 3D, 4D or 5D. If data is not densely sampled in the azimuth direction, reconstruction in this direction may make other assumptions, e.g., dip move-out (DMO) or time shifts relating to Levin's equation. As shown in Levin, the irregular Fourier Transform equation may be extended to compensate for such an effect.

If signals are emitted by different sources (i.e., having different signatures) in the non-blended data than in the blended data, a signature-shaping operation may be applied prior to subtracting the cross-talk noise. The signature-shaping operation means applying a filter that changes the shape of the signal on the non-blended data to simulate blended data.

Figure 9:
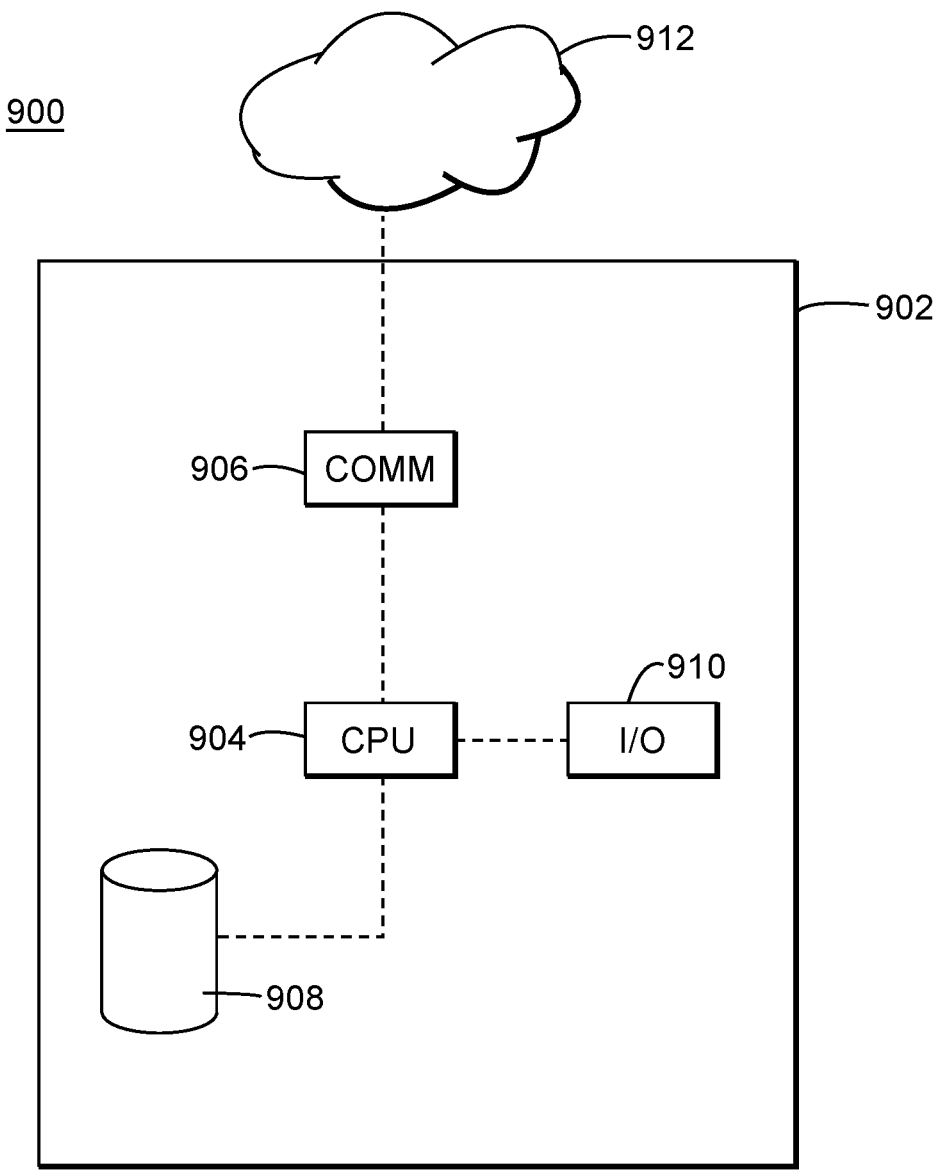
FIG. 9 is a block diagram of a seismic data processing apparatus according to an embodiment.

FIG. 9 illustrates a block diagram of a seismic data processing apparatus 900 configured to deblend a blended dataset using a non-blended dataset acquired for the same area, according to an embodiment. Apparatus 900 includes a computer or server 902 having one or more central processing units (CPU) 904 in communication with a communication module 906, one or more input/output devices (I/O) 910 and at least one storage device 908. Hardware, firmware, software or a combination thereof may be used to perform the various steps and operations of the methods described in this section.

Communication module 906 may be used to obtain the seismic datasets. Communication module 906 may intermediate wired or wireless communication of server 902 with other computing systems, databases and data acquisition systems across one or more local or wide area networks 912.

I/O devices 910 may be used to communicate with a user or to display any images or models of the surveyed underground formation. I/O devices 910 may include keyboards, point and click type devices, audio devices, optical media devices and visual displays.

CPU 904, which is in communication with communication module 906 and storage device 908, is configured, for example, to calculate a model dataset emulating the second blended dataset based on the first non-blended dataset, and to deblend the second blended dataset using the model dataset. Alternatively or additionally, CPU 904 is configured to transform the first non-blended dataset in a model domain, and to deblend the second blended dataset using the transformed first dataset.

Storage device 908 may include magnetic media such as a hard disk drive (HDD), solid state memory devices including flash drives, ROM and RAM and optical media. The storage device may store data as well as software code for executing various functions including the methods described in this section.

The disclosed exemplary embodiments provide deblending methods and apparatuses using a non-blended dataset to deblend a blended dataset. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A seismic exploration method for imaging gas and oil reservoirs in an underground formation, the method comprising:
    obtaining a first non-blended dataset acquired over the underground formation;
    acquiring a second blended dataset over the underground formation using plural sources whose listening times overlap;
    calculating a model dataset emulating the second blended dataset by:
        dividing the first dataset into spatial blocks, data in each spatial block having a common acquisition characteristic,
        interpolating the data in each spatial block of the first non-blended dataset to match source and receiver positions during the acquiring of the second blended dataset, and
        merging the interpolated data blocks to obtain the model dataset;
    deblending the second blended dataset using the model dataset to obtain at least one deblended second dataset corresponding to one of plural seismic sources; and
    generating an image of the underground formation based on the at least one deblended second datasets,
    wherein the common acquisition characteristic is one of mid-point, offset and receiver position.

2. The method of claim 1, wherein the model dataset is used to mitigate cross-talk noise in the second blended dataset by:

blending the model dataset to form a continuous recording trace;
pseudo-blending the continuous recording trace;
calculating a cross-talk estimate based on the pseudo-blended continuous recording trace; and
subtracting the cross-talk noise estimate from the second blended dataset.

3. The method of claim 2, further comprising:
generating a changemap including anticipated signal to blend noise ratios evaluated based on the model dataset.

4. The method of claim 3, wherein the changemap is used to derive space-time sparseness weights used to deblend the second blended dataset.

5. The method of claim 3, wherein the changemap is used to derive filters to be applied to the second blended dataset.

6. The method of claim 1, wherein
the model dataset is calculated by numerically blending the first non-blended dataset based on locations and times extracted from the second blended dataset, and
the deblending includes comparing blend noise of the blended first non-blended dataset and the second blended dataset.

7. The method of claim 1, wherein the first non-blended dataset was acquired earlier than the second blended dataset, and evolution of the underground formation is observed by comparing the image of the underground formation generated using the at least one deblended second dataset with an image of the underground formation generated using the first non-blended dataset.

8. The method of claim 1, wherein the first non-blended dataset and the second blended dataset are acquired intertwined during a same survey.

9. A seismic data processing apparatus for imaging gas and oil reservoirs in an underground formation, the apparatus comprising:
an interface configured to obtain a first non-blended dataset acquired over the underground formation and a second blended dataset acquired over the underground formation using plural sources whose listening times overlap; and
a data processing unit including one or more processors and configured
to calculate a model dataset emulating the second blended dataset by:
dividing the first dataset into spatial blocks, data in each spatial block having a common acquisition characteristic,
interpolating the data in each spatial block of the first non-blended dataset to match source and receiver positions with the second blended dataset, and
merging the interpolated data blocks to obtain the model dataset;
to deblend the second blended dataset using the model dataset to obtain at least one deblended second dataset corresponding to one of plural seismic sources; and
to generate an image of underground formation based on the at least one deblended second dataset,
wherein the common acquisition characteristic is one of mid-point, offset and receiver position.

10. The apparatus of claim 9, wherein the first non-blended dataset was acquired earlier than the second blended dataset, or
the first non-blended dataset and the second blended dataset are acquired intertwined during a same survey.

11. The apparatus of claim 9, wherein the data processing unit is configured to mitigate cross-talk noise in the second blended dataset using the model dataset by:
blending the model dataset to form a continuous recording trace;
pseudo-blending the continuous recording trace;
calculating a cross-talk estimate based on the pseudo-blended continuous recording trace; and
subtracting the cross-talk noise estimate from the second blended dataset.

12. The apparatus of claim 9, wherein the data processing unit is configured:
to generate a changemap including anticipated signal to blend noise ratios evaluated based on the model dataset, and
to derive space-time sparseness weights used to deblend the second blended dataset or filters to be applied to the second blended dataset, based on the changemap.

13. The apparatus of claim 9, wherein the data processing unit is configured
to calculate the model dataset by numerically blending the first non-blended dataset based on locations and times extracted from the second blended dataset, and
to compare blend noise of the blended first dataset and the second blended dataset while deblending the second blended dataset.

14. The apparatus of claim 9, wherein the data processing unit is further configured:
to transform the first non-blended dataset in a model domain; and
to deblend the second blended dataset using the transformed first dataset.

15. The apparatus of claim 14, wherein the data processing unit is configured
to deblend the second dataset by an inversion method using sparseness weights derived from the transformed first dataset,
to deblend the second blended dataset using an anti-leakage/matching method, and/or
to deblend the second blended dataset using a model domain masking, scaling or shaping function derived using the transformed first dataset.

16. The apparatus of claim 9, further comprising a non-transitory computer readable recording medium storing executable codes, which when executed by the data processing unit make the data processing unit to calculate the model dataset emulating the second blended dataset based on the first dataset, and to deblend the second blended dataset using the model dataset.

* * * * *